(12) United States Patent
Chiu

(10) Patent No.: US 6,845,177 B2
(45) Date of Patent: Jan. 18, 2005

(54) METHOD AND APPARATUS FOR MONITORING AN ANALOG METER

(75) Inventor: Ming-Yee Chiu, Princeton Junction, NJ (US)

(73) Assignee: Setrix Aktiengesellschaft, Munich Bavaria (DE)

( * ) Notice: Subject to any disclaimer, the term of this patent is extended or adjusted under 35 U.S.C. 154(b) by 638 days.

(21) Appl. No.: 09/773,247

(22) Filed: Feb. 1, 2001

(65) Prior Publication Data

US 2001/0055425 A1 Dec. 27, 2001

(30) Foreign Application Priority Data

Feb. 1, 2000 (EP) ............................................ 00101947

(51) Int. Cl.[7] ................................................ G06K 9/48
(52) U.S. Cl. .................. 382/199; 340/688; 340/870.02; 348/26; 348/135; 348/160; 356/606; 356/613; 356/615; 382/151; 382/202; 382/203; 382/260; 382/284; 382/287
(58) Field of Search ................................ 382/100, 151, 382/169–170, 190, 199, 202–203, 248, 260, 284, 287; 340/688, 870.02, 160; 356/615; 324/110

(56) References Cited

U.S. PATENT DOCUMENTS

| | | |
|---|---|---|
| 5,013,154 A | 5/1991 | Kominsky |
| 5,559,894 A | 9/1996 | Lubliner et al. |
| 5,673,331 A | 9/1997 | Lewis et al. |
| 5,870,140 A | 2/1999 | Gillberry |
| 5,870,495 A * | 2/1999 | Mancuso et al. ........... 382/199 |
| 5,898,494 A * | 4/1999 | Csipkes ...................... 356/511 |
| 6,208,266 B1 * | 3/2001 | Lyons et al. ........... 340/870.02 |
| 6,259,809 B1 * | 7/2001 | Maruo ........................ 382/151 |
| 6,527,181 B1 * | 3/2003 | Kleeberg et al. ....... 235/462.03 |

FOREIGN PATENT DOCUMENTS

WO    WO 95/27884    10/1995

OTHER PUBLICATIONS

Robert Sablatnig et al., "Machine Vision for Automatic Calibration of Analog Display Instruments", SPIE (1995), pp. 356–366, vol. 2423, Austria.
Robert Sablatnig et al., "Automatic Reading of Analog Display Instruments", IEEE (1994), pp. 794–797, 1051–4651/94, Austria.
E.R. Davies, "Machine Vision: Theory, Algorithms, Practicalities", (1996), pp. 240–245.
Ballard et al., "Computer Vision", (1981), pp. 128–131, Sec. 4.3, Ch. 4.

* cited by examiner

Primary Examiner—Bhavesh M. Mehta
Assistant Examiner—Gregory Desire
(74) Attorney, Agent, or Firm—Laurence A. Greenberg; Werner H. Stemer; Ralph E. Locher

(57) ABSTRACT

A method and apparatus for remote monitoring of an analog meter is set out which employs a Hough Transform on the edge points of the meter scale to obtain the center of the scale. The graduation marks and the needle are detected from the intensity profile along various radii. Thereby, the meter reading can be flexibly adopted to different meter scales during an easy training process. The method can be modified for oblique reading of the scale.

9 Claims, 6 Drawing Sheets

METHOD AND APPARATUS FOR MONITORING AN ANALOG METER

FIELD OF THE INVENTION

The invention refers to a method for monitoring an analog meter by recording a digitized image of the meter whereby the meter comprises a set of graduation segments and at least one needle. The invention further refers to an apparatus for performing the above method.

BACKGROUND OF THE INVENTION

Analog meters have been used in conjunction with sensors to provide visual display of the physical parameter that the sensor is designed to measure. Even though digital meters are now available, analog meters are still used widely, especially for situations where use of electricity is to be avoided for the reason of preventing electrical spark near the fuel storage tanks. These meters are usually installed in widely separated geographical regions so gathering the meter information requires wide-area communication network. Fortunately, the cost of sending compact digital data such as the meter reading or meter conditions is becoming very inexpensive nowadays. One example is the use of Short Message Service of the wireless GSM network. Therefore it is desirable to equip an analog meter installed in the field with a "non-contact" device that is capable of reading the meter digitally and sending the data or other conditions to a user or a computer system on the wired or wireless communication network. The reading device must be flexible to read different meters and must be able to perform a precise reading at reasonable time.

Previous image processing work by Robert Sablatnig et al.; "Automatic Reading of Analog Display Instruments", Proc. of the 12th International Conference on Pattern Recognition (1994), pp 794–797 as well as "Machine Vision for Automatic Calibration of Analog Display Instruments", SPIE Proc. on Machine Vision applications in Industrial Inspection III, vol. 2423 (1995), pp 356–366 described methods to read the analog utility (gas, water or electricity) meters. Utility meters differ from the gauge-like meter. First, a utility meter has multiple dials. Each dial has a needle that reads one digit (0–9) of the entire reading. In contrast, the gauge-like meter has only one dial or scale with fine reading resolution ranging from 1 out of 50 or 1 out of 1000. Second, the needle of a utility dial rotates continuously in one direction only. The needle of the gauge-like meter can only rotate in less than 360 degree and in both directions. Sablatnig et al. use the Hough transform technique to detect and locate the outlining circles of all dials in the utility meter. There is no detection of the graduation marks of the dial. The basic operation of the Hough Transform is described in Ballard and Brown: "Generalizing the Hough transform to detect arbitrary shapes", Pattern Recognition Vol. 13(2) (1981), pp 111–122 and E. R. Davies: "Machine Vision: Theory, Algorithms, Practicalities", Academic Press (1996).

U.S. Pat. No. 5,013,154 describes a "System for remotely reading an analog meter". The teaching of this patent uses a video camera and an information processing system with look-up table to read gauge-like analog meters. The patent assumes that a pre-defined path of interest on the image plane is known. The information processing system extracts the intensity profile along the pre-defined path from the image and detects the location of the needle pointer based on the reflectivity difference between the needle and the background. A relative distance along the defined path between the needle and the starting point of the defined path indicates the reading. One assumption that the patent makes is that there is no black character, graphics or scale mark along the path of interest that can interfere with the black needle. The patent also assumes that the position and orientation of the meter is fixed with respect to the imaging system.

U.S. Pat. No. 5,673,331 teaches methods for reading gauge-like analog meters from video images. It also assumes that the position and orientation of the meter is fixed. Using a pre-operation calibration procedure to determine data such as the position of the needle pivot point and the leftmost and rightmost points of travel of the needle, the system performs the reading by locating the angular position of the needle pointer and compares it with the calibrated data. It uses a 2D template matching technique to determine the angular position of the needle.

U.S. Pat. No. 5,559,894 describes methods for inspection and reading of utility meters (not gauge-like meters). It first uses pre-defined templates to identify a particular meters and determine its relative position and orientation with respect to the fixture. From the position and orientation data, the angular positions of all the dial needles are determined. Again, one dial decides one digit of the meter reading.

It is an objective of the invention to provide a method for monitoring an analog meter which is flexible and allows easy installation for various existing analog meters.

It is another objective of the invention to provide an apparatus to perform that method so that flexible installation and remote monitoring of various analog meters is allowed.

SUMMARY OF THE INVENTION

With respect to the method the objective of the invention is solved by a method for monitoring an analog meter having a set of graduation segments and at least one needle, the method comprising the steps of: recording a digitized image of the meter, the meter; extracting a set of edge points representative of the graduation segments from said image; performing a Hough Transform on said set of edge points to obtain a center point of said set of graduation segments; and extracting an intensity profile of said image along a path through said graduation segments to obtain a set of detected graduation segments and to obtain a position of said needle relative to said set of detected graduation segments.

With respect to the apparatus the objective of the invention is solved by an apparatus for performing the above method for monitoring of an analog meter comprising: a sensor for obtaining a digitized image; a processor for extracting a set of edge points representative of graduation segments of said meter from said image, for performing a Hough Transform on said set of edge points to obtain a center point, for extracting an intensity profile of said image along a path through said graduation segments to obtain a set of detected graduation segments and for obtaining a position of said needle relative to said set of detected graduation marks; and an interface device to communicate with a communication network.

The algorithm according to the method locates the center of the meter scale and then detects the graduation marks of the scale. It detects the leftmost and rightmost travel of the scale and the needle pointer. From these data, the meter reading is derived by comparing the relative position of the needle within the arrangement of the detected graduation marks. The invention is applicable to utility meter having a graduation scale and at least one needle. The algorithm can read multiple meters within one image and computes the reading even when the analog meter is viewed from an oblique angle. Due to the parallel shift between the scale and the needle pointer, additional computational effort must be performed. The method employs the Hough Transform to obtain the center of the scale and the needle. Whereas the Hough Transform usually is used with a continuous area, the method according to the invention applies strong edge points from the set of individual spaced graduation marks as input signals to the Hough Transform.

Only during the training period, when the method and the apparatus are adopted to a specific meter, it is necessary to perform the Hough Transform for the detection of the graduation marks. When the relative arrangement between the meter and the camera of the sensing apparatus does not change, it is sufficient to extract the intensity profile and detect the position of the needle within the graduation scale. When the algorithm detects that the meter moved, meter and graduation scale detection by employing the Hough Transform has to be performed again. As detection criterion for a move of the meter, a parameter which represents the accuracy of the location of the needle is used. Advantagously, this parameter is the number of contiguous angles where the intensity profile is low in the area between the center point and the graduation marks of the scale. This parameter indicates the width of the needle.

The Hough Transform is performed on strong edge points of the rectangular shaped graduation marks. The transform computes candidate segments in the direction orthogonal to the gradient of an edge point and at a predefined distance apart form the edge point. By calculating an extreme value of the distribution of the candidate segments and the centroid of the extreme value, the coordinates of the center of the scale and the needle are obtained.

From the intensity profile of the graduation marks each graduation mark can be individualized by locating extreme values ("teeth") and applying a deep-pocket criterion to eliminate any local extreme values which do not originate from a graduation mark.

When a meter is viewed from an oblique angle the circular graduation scale appears as an ellipse. A circular intensity profile may not capture all graduation marks so that more than one intensity profile at different radii is extracted, and the detected intensity teeth are merged to obtain a full graduation scale. The correct scale of graduation marks is detected when the number of teeth is close to the specified number of graduation marks. Practically, an arrangement of detected teeth is considered as the correct graduation scale whose number of detected teeth is within plus or minus one of the specified number of graduation marks.

Further when viewing with an oblique angle, the pivot center of the needle and the center of the scale do not coincide. Then, another Hough Transform calculates the center of the needle since the needle either has the shape of a disc or has a hole near the needle pivot center. The input area to the Hough Transform can be restricted to the surrounding area of the scale center. The Hough Transform is performed in the conventional manner.

The method and the apparatus can be used for condition reporting of analog, utility type meters using a wired or wireless communication network, When the actually captured meter value meets a certain condition, which can be input via the network, a message or condition report is transmitted to a central control station. There, further activities can be initiated.

The apparatus for performing the method has a fully digital architecture and can be further integrated when circuit technology advances. The imaging subsystem captures the image of the meter. The embedded processor performs image processing as well as image analysis to derive the meter reading iin form of a digital value. The CPU may run web server software so that it reacts to the requests of a client connected through communication modules within the apparatus, such as ISDN, Modem or GSM modules. If the Short Message Service of a GSM network is used, then any cellular phone can read any meter independed of the time and place.

BRIEF DESCRIPTION OF THE DRAWINGS

The accompanying drawings show the principles of the invention and an preferred embodiment. Corresponding elements are denoted by like numerals. The drawings show.

DETAILED DESCRIPTION OF THE INVENTION

Figure 1:
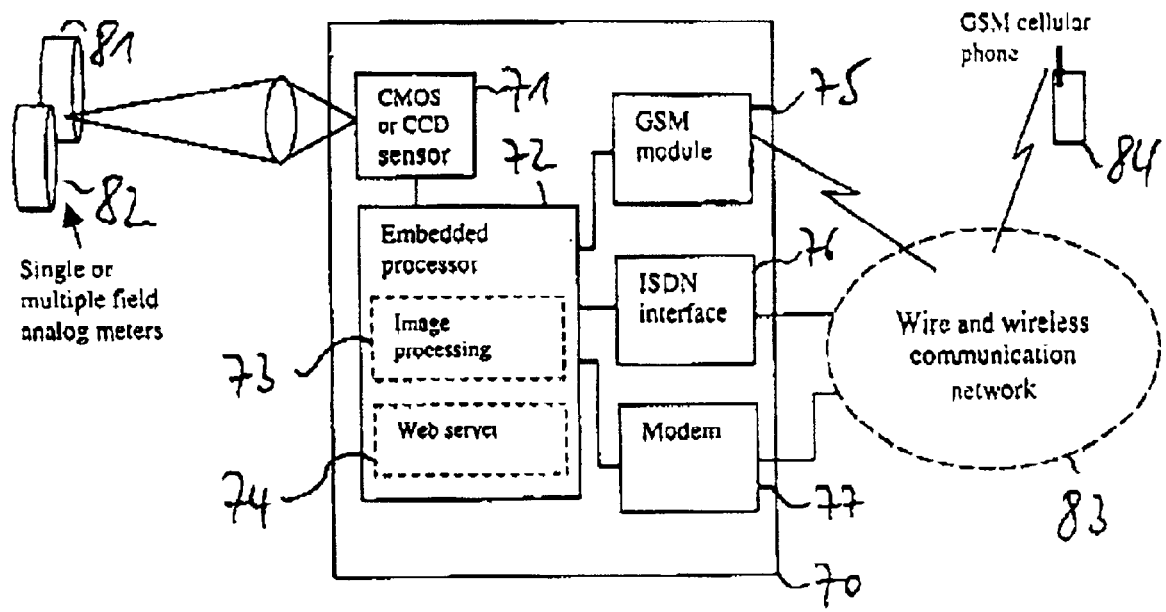
FIG. 1 a block diagramm of a meter reading apparatus.

The present invention relates to an apparatus consisting of an imaging subsystem and a computer or an embedded processor to process the image from the imaging subsystem. The image from the imaging subsystem is digitized and stored in the computer for further processing. Without loss of generosity, it is assumed that the image is digitized with a square spacing.

Usually the camera views the analog meter in an orthogonal or normal direction. The circular scale will then look like a circle on the image. However, in some situation the camera has to be positioned sidewise so that the meter is viewed obliquely. In this case the circular scale will appear as an elliptic shape. This invention can deal with both situations.

The method and the apparatus according to the invention serves to read a wide variety of analog meters. Therefore the design of the machine vision algorithm is to detect and locate features that are common among analog meters. From the image processing perspective, an analog meter consists of a circular graduated scale, a needle pointer, characters and logos on the dial surface and a metal or plastic casing. The graduation scale, the characters and graphic logos are all located on the scale surface. The needle moves on a plane that is usually higher than the plane of the scale. Therefore if the meter is viewed obliquely, the center of the pointer will not coincide with the center of the graduation scale.

There are many designs of the graduation scale. However, almost all analog meters have a basic graduation scale that is represented by short radial line segments (RLS) arranged in a circle. The angular span of the scale can be from 60 degree (e.g., a voltmeter) to 270 degree (e.g., most pressure gauges). All radial line segments intercept at the center of the scale, which is also the center of rotation of the needle if the meter is viewed normally. Some meters have duel graduation marks in reading in different units. The angular spacing between the scale graduation marks is not necessary uniform. Because all meters have this radial line pattern, the present invention detects and locates this radial line segment pattern. By comparing the needle angle with respect to the angles of the detected graduation marks, the present invention can read meters with linear or non-linear graduation scale.

Many analog meters have longer coarse graduation marks separated at multiples of the finest graduation marks. In the present invention, only the finest graduation marks, or the finest spaced RLS, are detected and used.

Needle pointers can also take many shapes. In general, a needle is narrow on one side of the needle pivot point. On the other side, the shape can be arbitrary, but usually is wider and shorter. The needle tip may or may not reach into the region of the graduation marks. The needle usually has a circular shape near the needle pivot center.

Characters and graphics on the scale surface show the coarse scale numbers, the company logos and other information. Even though useful to a human reader, these characters and graphic symbols are not detected and used in the present invention. During training of a meter type, the system needs to know what reading the leftmost graduation mark is and how much reading increment for each increment of graduation mark. In some analog meters, the leftmost graduation mark does not necessarily correspond to a zero reading.

The casing of the analog meter is usually round. If the casing is made of stainless steel, its reflective surface made it an unreliable feature for image processing. When the illumination is not diffuse and uniform, the casing can cast a shadow on the surface of the scale. If viewed normally, the shadow takes the shape of a partial circle and it co-exists with other circle features from the round casing.

The automatic reading device 70 shown in FIG. 1 comprises an image sensor 71 which captures an image of a single or several analog meters 81, 82. The sensor may be a CMOS image sensor or a CCD device. The apparatus comprises an embedded processor 72 which preferably runs with a standard operating system. The processors 72 performs the algorithm for image analysis and meter reading. The processor has an image processing subsystem 73 and a communication subsystem, preferably a web server module 74 as shown in the example. The processor is connected to one or multiple communication modules, e.g. a GSM module 75, an ISDN interface 76, or an analog modem 77. The communication module provides connectivity to a wired or wireless communication network 83. Via the communication network 83 the device 70 can communicate with a central station which monitors the operation of the device or responds to inputs from the device. Any communication over the wireless communication network may employ Short Message Service. The device 70 may also receive control inputs from a cellular phone 84. The input may be a reference value for comparison with the meter reading. When the read value exceeds the reference value, a transmission of a message is performed.

Figure 2:
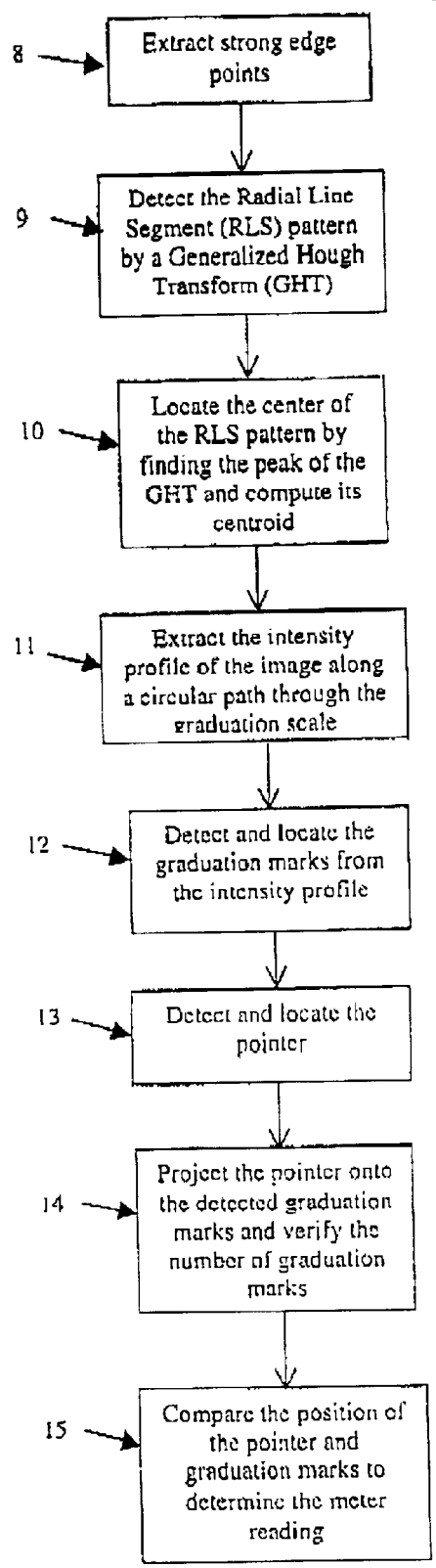
FIG. 2 a flowchart of the operation of the apparatus for orthogonally viewing the meter scale.

FIG. 2 shows a flow chart depicting an overview of the vision algorithm software performing the automatic reading of an analog meter when the meter is viewed from a normal direction. For an oblique-view image of a meter, more processing steps are needed which will be described later in connection with FIG. 7. In the first step 8 of FIG. 2, two 3×3 Sobel edge operators are convolved with the image of the analog meter to obtain the horizontal and vertical edge gradient ($g_x$, $g_y$). The magnitude and the direction of the edge gradient are computed. All pixels with a gradient magnitude greater than a threshold are classified as strong edge points. The threshold for the gradient magnitude should be set so that most of the edge points of the graduation marks are selected. It can be a fixed parameter or defined during the meter type training stage by computing the average gradient magnitude of the graduation marks in an area selected by the human trainer.

Figure 3:
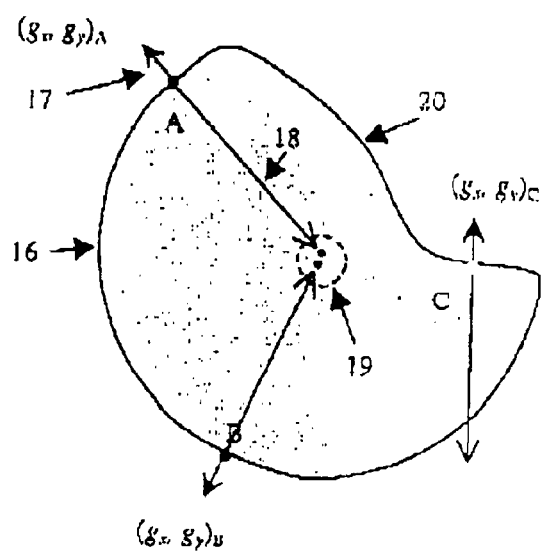
FIG. 3 edge points for a Hough Transform of a contiguous area.

Hough transform (HT) in general is used extensively in the past for the detection of lines, circles, ellipses, and other shapes such as corners, and polygons. The book by Davies has an extensive discussion on the techniques. In the prior art, the shape detected by Hough Transform is mostly formed from one single contour, whereas the invention uses the Hough transform for the detection of multiple radial line segments (RLS) arranged on a circle. The RLS as such are separated from each other. To explain the Hough Transform technique for the circular RLS pattern, it is instructive to review the HT for the circle detection first, Referring to FIG. 3, the black disk 16 has an irregular boundary 20. After edge gradient operation and thresholding, all strong edge points, such as A, B, or C, lie on the boundary 20. For a black disk, the edge gradient points outward. Thus at strong edge point A, the opposite of its edge gradient 17 points toward the center of the circle. Therefore if the radius of the circle R is known, a candidate center point that is R distance away from the edge point A along the negative gradient direction 18 is placed on a so-called parameter plane. The parameter plane refers to the x- and y-coordinates of the center of the circle. Each candidate point is a vote at its location on the parameter plane. For another strong edge point B that is also on the edge of the same circle, another candidate center point will be placed close to the previous one. On the other hand, for a strong edge point C that is not on the edge of the same circle but on the irregular boundary 20, its candidate center point will be located at some other place. By accumulating all the candidate center votes from all strong edge points, a cluster 19 will be formed at the center of the circle. The location of the circle can then be determined by peak detection of the cluster. If the radius of the circle is not known, then the parameter space becomes three-dimensional, or multiple parameter planes. Each parameter plane is used to accumulate candidate center points for each circle of specific radius. If a peak is detected on a parameter plane of a particular radius, then a circle with this specific radius with center at the peak location is found. Since multiple parameter planes consume large memory, therefore in practice a range of potential radius is given and only one single parameter plane is used. In such case instead of placing a candidate center point, many points along a candidate center "line segment", which corresponds to the range of potential radius, is placed on the parameter plane for vote accumulation. Then a peak corresponds to the detection of a circle with a radius within the range given. If needed, further processing can determine the exact radius of the circle. With a slight modification, the Hough Transform can be used to detect a hole whose edge gradient points inward toward the center of the circle.

Figure 4A:
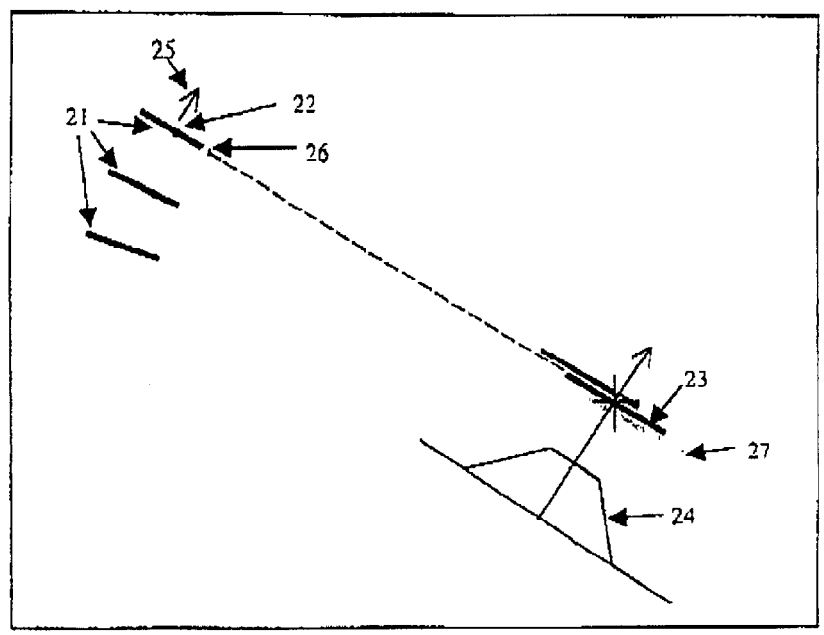
FIGS. 4A and 4B stand 4C candidate segments for a radial line segment of the graduation scale, edge points of the graduation scale, and two different sets of candidate segments for the full graduation scale, respectively.
Figure 4B:
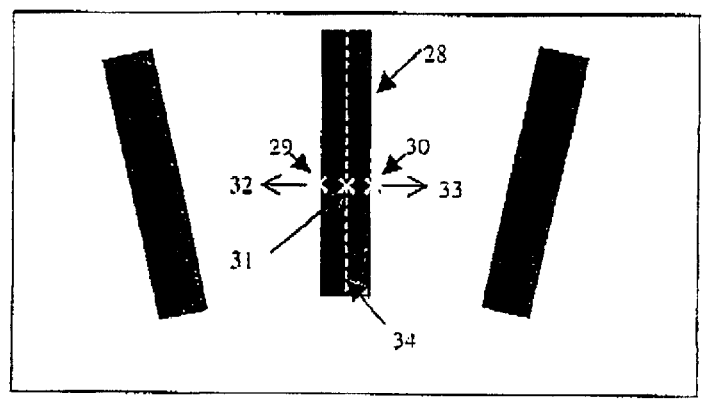

The Hough Transform according to the invention for the circular RLS pattern is now described. Like the circle Hough Transform, only a single parameter plane will be used for vote accumulation. Referring to FIG. 4B, under spatial digitization, each RLS is a narrow rectangle 28. The previous edge extraction step 8 actually extracts two lines of strong edge points such as 29, 30 along two sides of the medial axis 34 of the RLS. The two edge points 29, 30 of a RLS have opposite gradient direction 32, 33 and are slightly off from the medial axis of the RLS. Ideally, the center of the RLS pattern lies on the medial line of the RLS, not the two edges of the RLS. However, it is assumed for now that the edge points are very close to the medial line.

Figure 4C:
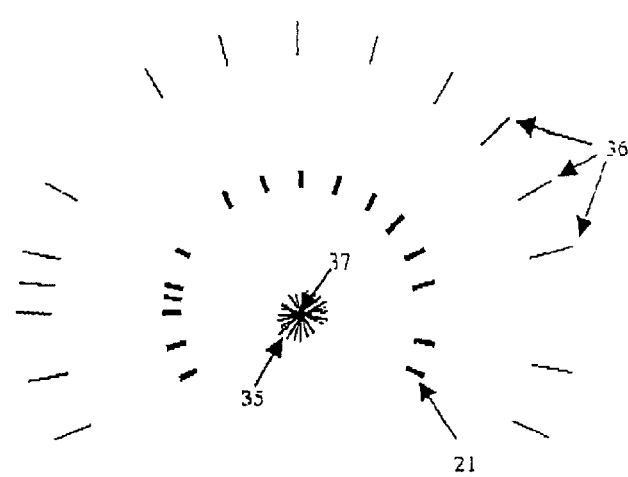

It is assumed that the mean radius $R_0$ of the circular RLS pattern, or the distance from the center of the pattern to the middle point of the graduation mark, is given. Referring to FIG. 4A, for each strong edge point 22 (which can come from either side of a RLS), a candidate line segments 23 orthogonal to the edge gradient 25 is placed on the parameter plane for vote accumulation. The distance from the strong edge point 22 to the middle of the candidate line segment 23 should equal to the mean radius $R_0$. The length of the candidate line segment, which is denoted as G, is selected as a fixed factor $\alpha$ multiplied by the length L of the RLS, which is also given. Usually this factor is greater than 1. Since the center of the pattern can be located on either side of the strong edge point 22, another mirrored candidate line segment (not shown in FIG. 4A) on the opposite side of the strong edge point 22 will also be placed on the parameter plane. For another strong edge point 26 on the same RLS, similar candidate line segments 27 of length G, with an axial shift, will be placed on the parameter plane. The accumulated votes from all edges points on a RLS form a trapezoidal line spread function 24. The base of the trapezoidal line spread function has a width of G+L and the top plateau region has a width of G−L. For edge points on another RLS, two candidate line segments with the same line spread function will be placed on the parameter plane with a slightly different angle. As shown in FIG. 4C the one of the candidate line segments focusing toward each other will create an overlapping radial pattern 35 around the center of the original circular RLS pattern 21 while the other set 36 will spread widely around a larger circle. This vote distribution function on the parameter plane will have a peak 37 located at the center of the RLS pattern 21. Normally the peak to background ratio is very high for analog meters because most of the non-RLS related edge points contribute candidate points that are spread sparsely on the parameter plane. On the other hand, there are 10–15 strong edge points from each of the 50–100 graduation marks that contribute candidates line segment concentrating near the center of the RLS pattern.

The two processing parameters: the mean radius $R_0$ of the circular finest graduation marks and the length of the finest graduation marks L, depend on the meter type. Both parameters are defined during the training of the meter type. When a meter of multiple graduation scales exist, the selection of mean radius $R_0$ decides which graduation scale will be used.

The use of the edge points in lieu of the median line points for Hough Transform described above can be improved by a simple technique. Referring back to FIG. 4B, if the distance W between the two edge points 29, 30 is known, then an estimated median line point can be obtained by shifting the edge point a distance W/2 along the negative edge gradient direction. Ideally the distance W is determined by the number of pixels sampled across one graduation mark (or one RLS) which varies from meters to meters and from fine graduation marks to coarse graduation marks. Experiments show the shift of 1 pixel is satisfactory for most meters with appropriate image resolution (320×240 to 640× 480 pixels).

The next step 10, shown in FIG. 2, is to detect and locate the peak from the vote distribution function generated from the Hough Transform described above. If there is only one circular RLS pattern (or one analog meter) in the image, which is usually the case for analog meter reading, then the peak can be determined by finding the maximum of the vote distribution function. If there are multiple meters in the image, then the second peak can be found by searching for a maximum after zeroing out the value of the vote distribution function around the first peak region The process can be repeated for detecting more meters. The center of the circular RLS pattern can be estimated by computing the centroid of the peak, e.g. using the formula $$x_c = \sum_{i,f} x_i f(x_i, y_j) \Big/ \sum_{i,j} f(x_i, y_j),$$

$$y_c = \sum_{i,f} y_j f(x_i, y_j) \Big/ \sum_{i,j} f(x_i, y_j).$$

The summation is over a limited area around the peak of the vote accumulation function f. Because the peak to background ratio is usually high, the centroid estimate is not very sensitive to the size of the summation area as long as the entire peak is included within the summation computation.

The detection and localization of the RLS pattern by the Hough Transform according to the invention do not require that the radial line segments occupy a complete circle or are uniformly distributed in angle. Graduated scales of most pressure gauges have a 270-degree span while scales of most electronic analog multi-meters have less than 90-degree span. However, the estimated centroid location of the RLS pattern is slightly sensitive to the correctness of the mean radius given, especially if the angular span of the RLS pattern is less than 180 degrees. This is because if the mean radius given is either shorter or longer, the line spread function 24 (FIG. 4A) coming from an RLS will not be centered at the center of the RLS pattern. Thus if there is no similar line spread function contribution from an RLS 180 degree apart, the accumulated votes will not be symmetrical around the center. When contiguous candidate line segments are missing from one side, then the computed centroid will be shifted away from the true center of the pattern.

The center of the RLS pattern corresponds to the center of the meter's scale. The next step 11 (FIG. 2) is to extract the intensity profile of the image cutting through the finest-spaced graduation marks. A circular path centered at the estimated center of the RLS pattern and with the mean radius $R_0$ is used to extract the intensity profile. The next step 12 is to detect and locate the individual graduation marks. A graduation mark appears as a deep-pocket minimum, called a "tooth", on the intensity plot. For repeated black graduation mark pattern(s), the teeth form a comb-like pattern on the intensity profile. Since there are characters or graphics on the scale surface, the intensity profile may contain other teeth that have a spatial frequency quite close to that of the graduation marks. In other words, the intensity profile can contain sections of comb-like teeth structure from characters and graphics quite similar to those from the graduation marks. The algorithm needs to distinguish combs corresponding to the graduation marks from combs that are not graduation marks.

Figure 5A:
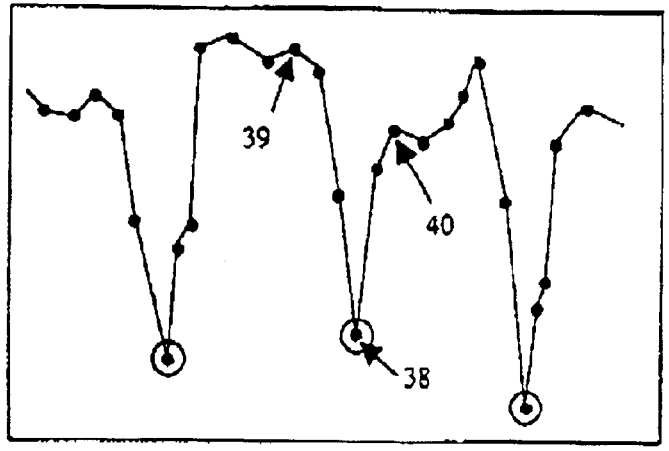
FIGS. 5A and 5B and 5C different intensity profiles with local maxima and minima.
Figure 5B:
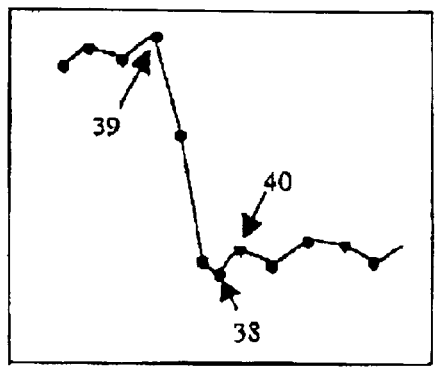
Figure 5C:
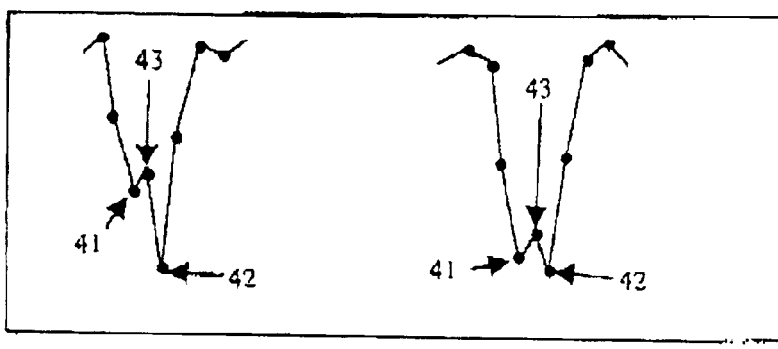
Figure 6:
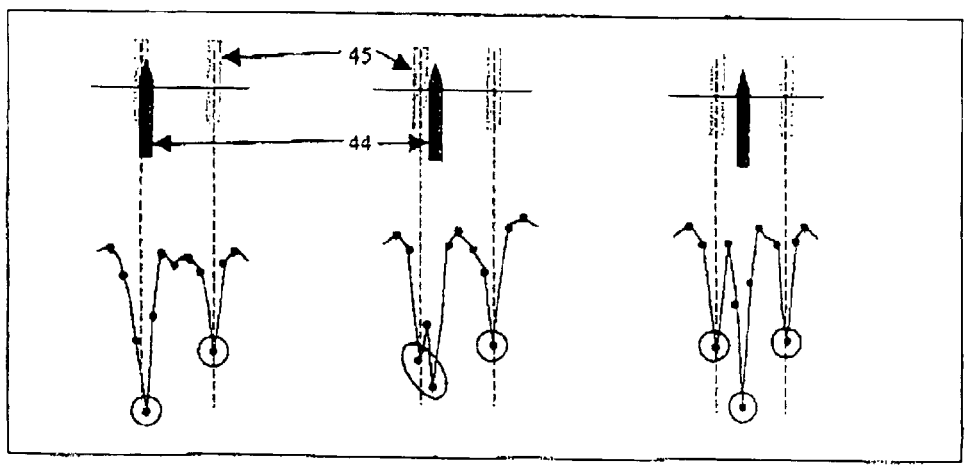
FIG. 6 a relation between a needle pointer and radial line segments as well as corresponding intensity profiles.

A detailed explanation of the step 12 follows. First all the teeth are located. Then the spacing between teeth are checked so that only contiguous teeth with spacing less than a threshold are grouped into combs. Finally the one comb with the number of teeth that is close to a specified number of graduation marks is considered as the correct graduation scale. From this detected graduation scale, the angular positions of the beginning of the scale and the end of the scale are determined. Referring to FIG. 5A, a tooth is defined as a local minimum in intensity 38 whose intensity's increase to the nearby local maxima 39, 40 is greater than a pre-defined threshold, as shown in the figure with the data points circled. This deep-pocket criterion for both sides of the local minimum can eliminate an intensity edge as shown in FIG. 5B. However, it also ignores some legitimate teeth as shown in FIG. 5C that occurs because of the noise in the image intensity (left diagram) or a thick graduation mark (right diagram). Therefore the software will detect these teeth by finding two neighboring one-sided steep minima 41, 42 that are separated by a distance less than a threshold. In this case, the location of the teeth is defined as the midpoint between the two local minima. Once all the teeth are detected, the algorithm then checks for the spacing between neighboring teeth. All teeth with neighboring spacing less than a threshold are grouped into one comb. This spacing threshold can be computed as the median value of all the spacing between neighboring teeth. In other words, there are 50% of the neighboring teeth's spacing below this threshold and 50% above. The median of the teeth's spacing, instead of the average of the teeth's spacing, is a reliable method to estimate the spacing between the graduation marks because more than 50% of the teeth detected are graduation marks. Since the intensity profile is an angular function, the beginning and the end of the profile array actually are neighbors. Thus the algorithm needs to check if a comb at the end of the intensity profile actually connects to a comb at the beginning. After all the combs are detected, the algorithm finds one comb whose number of detected teeth is within plus or minus one of the designed number of graduation marks. This comb corresponds to the graduation scale. The reason for plus or minus one is to account for the tip of the needle pointer. As shown in FIG. 6, when the tip of the needle is included in the intensity profile, its position can either overlap, separate slightly or separate completely from the graduation marks as shown in the left, middle and right diagrams. The corresponding intensity profiles of these three situations are shown at the bottom. For the right diagram case, the total number of detected marks is one extra. For the middle case, the needle and the touching graduation mark may both be missed because of the intensity fluctuation. Therefore the detected number is one less. For the left diagram case, the detected number of graduation marks is the same as the designed number.

When none of the comb has a teeth number that matches the designed number of graduation marks, then it is possible that some graduation mark has so low a contrast that it is not detected. In this case, the graduation scale is divided into two or three combs. Therefore the algorithm checks for two or three neighboring combs to see if the total number of teeth come close to the designed number of graduation marks. If yes, then the algorithm can interpolate the missing graduation marks. If no, an error message is given.

Next step 13 is the detection and localization of the needle pointer. When the meter is viewed normally, the scale center coincides with the needle pivot point. Since the needle can rotate to any angular position within the range of the scale, the black needle can overlap with the high-contrast black graphic background at many possible needle angles. Therefore two sides of the needle may not appear as straight lines.

To avoid the problem due to complex background, U.S. Pat. No. 5,673,331 uses the template matching technique to match the shape of the needle at various angles to the image. The angle with the best match score determines the angle of the needle. The technique requires that the shape of the needle be trained first. The present invention, however, uses a simple and fast method that also overcomes the problem of cluttered background. This technique is based on the observation that at angles where the needle is located, the radial intensity profile from an inner radius $R_1 = a*R_0$ to an outer radius $R2 = b*R_0$ shows "contiguously" low value. There the algorithm searches for those angles whose intensity values of the radial intensity profile are below a preset threshold "contiguously" between radii $R_1$ and $R_2$. Typical values for a and b are 0.4 and 0.85 respectively. Both parameters can be meter-dependent. Since a needle has some finite width, several contiguous angles satisfy this requirement. Then an average can be taken as the needle angle if all angles are contiguous. If there are more than one group of contiguous angles, then it is an indication of multiple detected needles. For analog meter with only one needle, multiple detected needles will signal an error.

Once the angle of the needle is extracted, the next step 14 is to project its angular position onto the graduation marks detected earlier. If the number of graduation marks is one more than the designed number, it can be verified now that the extra tooth indeed comes from the needle. If not, it is possible that the pointer does not appear as a separate teeth and some spurious intensity noise has generated the extra teeth. By examining the spacing between the teeth, this spurious tooth can be removed.

The last step 15 is to convert the needle angle to meter reading. There are two methods. The first is to find the two graduation marks where the pointer lies between. From the relative angular position of the pointer and the two neighboring marks, a sub-graduation reading can be made by interpolating between the angles of the two graduation marks. The second method is to fit all the detected graduation marks with a continues linear function or nonlinear function so that a mapping between the angle to the reading can be made. Knowing the angle from the first scale mark to the needle, the reading can be obtained from the fitted mapping function. As mentioned in the beginning, the first graduation mark may not necessarily represent a zero reading.

The processing flow as shown in FIG. 2 can determine the arbitrary position and orientation of the analog meter. This is especially useful during the training phase, or during the field installation testing after installing the automatic reader to the field meters. Afterward, if the imaging conditions remain the same, then the position of the scale center, the angular position of the first graduation mark, the average spacing between graduation marks and the mapping between angle to reading will not change. Therefore for a new reading, only the needle angle needs to be detected and located. In other words, only the last three processing steps 13, 14, 15 in FIG. 2 are needed once the relative positions between the meter and the meter reader is fixed.

Figure 8:
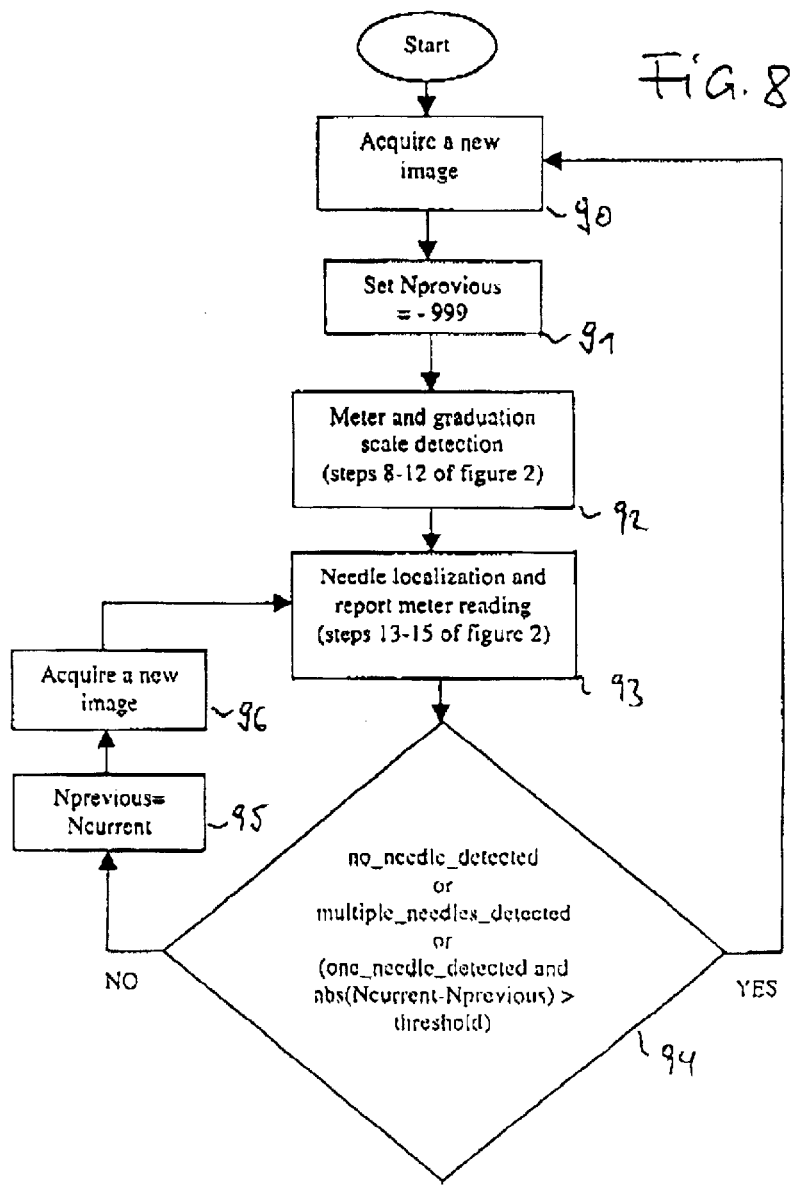
FIG. 8 a flowchart for the operation of the apparatus with a detection for any moving of the meter.

Refering to FIG. 8, the switching between the full processing of meter reading (8–12 in FIG. 2 and step 93 in FIG. 8) and needle localization processing (13–15 in FIG. 2 and step 93 in FIG. 8) can be done automatically by using one parameter readily available in the needle localization processing. In the processing step 13, There are several contiguous angles where the intensity is contiguously below the threshold intensity along the radial direction from $R_1$ to $R_2$. When there is one needle detected, the number of these contiguous angles (denoted as N) is proportional to the width of the needle and should remain roughly the same when the needle is rotated to different angle. However, if the relative imaging conditions changes (such as the when the analog meter is moved), then the needle localization processing can detect no needle, or multiple "false" needles, or possibly one "false" needle. Therefore, when one needle is detected, the algorithm checks if N changes substantially from the previous needle localization processing in step 94. If yes, it is an indication of the change of imaging conditions and the algorithm switches to the full processing. This process is shown in FIG. 8 when the algorithm performs the meter reading continuously in a loop 93, 94, 95, and 96. Since the meter and graduation scale detection/localization normally take longer to compute, the partial processing of needle localization can increase the response time of the system substantially. Thus, the processing time which is in the range of several seconds for the full algorithm including Hough Transform can be reduced to a fraction of a second for the needle detection and localization only.

The algorithm described above can be extended for situations when the camera views the analog meter from an oblique angle. There are several changes to the image. First, the circular graduation scale becomes an elliptical graduation scale. However the radial line segments of the graduation marks still intercepts at the center of the graduation scale. Therefore the Hough Transform according to the invention still works for the elliptical radial line segment pattern. If the oblique viewing angle is $\Phi$, then along the major axis of the elliptical graduation scale, the mean major radius is still $R_0$ and the mean minor radius is reduced to $R_0*\cos \Phi$ along the minor axis. The length of the radial line segment is also reduced by a $\cos \Phi$ factor from the major axis direction to the minor axis direction. The spacing between two contiguous graduation marks however is reverse, going from a distance of $\Delta g$ to $\Delta g*\cos \Phi$ from the minor axis to the major axis. In other words, the ratio of the angle of two contiguous graduation marks along the major axis to that along the minor axis is $\cos^2 \Phi$. The second change in the oblique meter image is that the center of the pointer no longer coincides with the center of the graduation scale. This is because the pointer rotates on a plane that is higher than the plane of the scale. Therefore the technique to perform the reading from an oblique image will be different. The third possible change is that the round casing of the analog meter may obstruct some graduation marks. The present invention can still perform the reading of an analog meter even when part of the radial line segment is missing for some graduation marks. If the obstruction is so large that the complete radial line segment is missing for some graduation marks, then the system will raise an error message.

Figure 7:
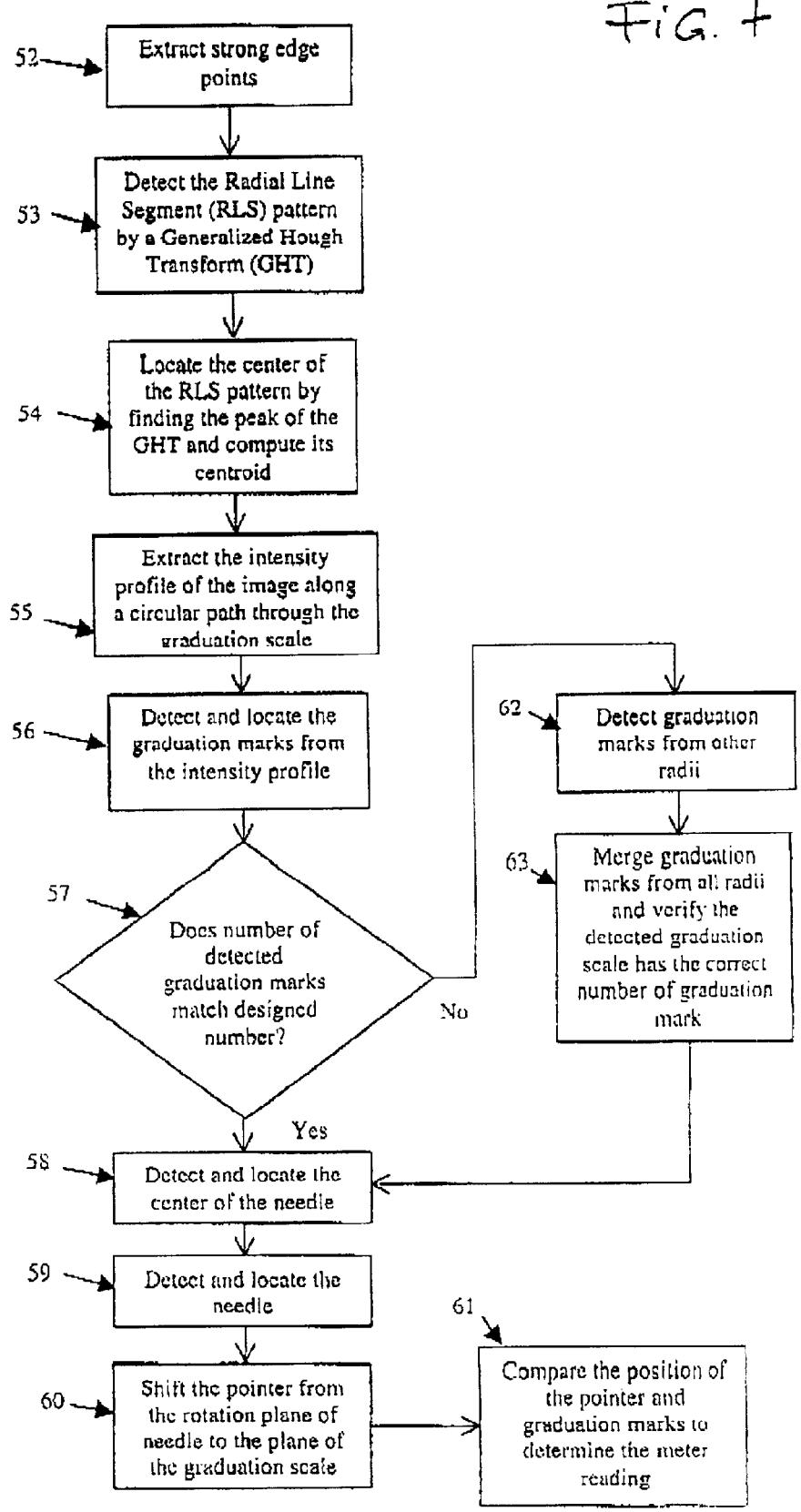
FIG. 7 a flowchart for the operation of the apparatus for oblique viewing the meter scale.

FIG. 7 depicts an overview of the processing flow when the meter is viewed obliquely. The first step 52 is the same as that in FIG. 2. The second step 53 uses the Hough Transform algorithm according to the invention to detect and locate the elliptical RLS pattern. It is similar to that for the circular RLS pattern except that the two operating parameters $R_0$ and L need to be selected differently. From the center of the graduation scale, the strong edge points of the graduation marks can now have a shortest distance of $R_0*\cos \Phi - L*\cos \Phi/2$ up to a longest distance of $R_0+L/2$. Therefore instead of specifying $R_0$ and L to the Hough Transform algorithm, the user selects the shortest distance $R_1$ and the longest distance $R_2$ of the edge points of the graduation marks during the training. The system computes the $R_0$ and L by using the formula: $R_0=(R_1+R_2)/2$ and $L=R_2-R_1$. The length of the candidate line segment G on the parameter plane is then equal to $\alpha*L$, where $\alpha$ can be a fixed number different from that for the circular RLS pattern.

The following step 54 is also the same as that in FIG. 2. The peak from the vote accumulation of the Hough Transform still stands out clearly on the parameter plane. The next two steps 55, 56 are the same as those in the case of circular RLS. There are two situations. When the viewing angle is small or the graduation marks are long, the intensity profile can capture all the graduation marks and the graduation scale can be detected correctly. Then the algorithm can proceed to step 58 after the decision box 57. However, if the viewing angle is large, the intensity profile along one single circle may not capture all the graduation marks that are now on an ellipse. In this case only certain sections of the graduation marks will be detected on one single intensity profile. Multiple circular intensity profiles at different radii are needed. This is done in step 62 by repeating the extraction of intensity profiles and the detection of the graduation marks from all circles with radii ranging from $R_1$ to $R_2$. The teeth extracted from on intensity profile can correspond to some points one the graduation marks of the meter scale, but not all. Furthermore multiple teeth extracted from intensity profiles of different radii can belong to the same graduation mark. Thus step 63 is used to merge all the angular coordinates of all the teeth together, then order them according to the angular value, and then group teeth with nearly the same angular positions together. Each grouping of the teeth can correspond to one graduation mark, or a corresponding angle of a radial line segment. The angular position of the graduation mark can then be computed as the average or the median of all the teeth in one grouping. At this point, there is one comb whose number of teeth is within plus or minus one of the design number of graduation marks. Then this is the detected graduation scale with each graduation mark located at an angular position that is the average of all angles belonging to the same radial line segment as mentioned earlier.

After the graduation scale is detected and located in 57 or 63, the next step 58 is to detect and locate the center of the needle. As mentioned earlier, the center of the needle does not coincide with the center of graduation scale obtained in 54. To determine the center of the needle, the traditional Hough Transform for circle detection is used since the needle has the shape of either a black disk or a white hole near the needle pivot center. Due to the fact that the center of the needle is not far from the center of the graduation scale, the Hough Transform can be speeded up by using only strong edge points within a region near the graduation scale center. Once the center of the needle is obtained, the needle angle can be determined using the same technique 13 of FIG. 2. However this needle angle is with respect to the needle center, not the center of the graduation scale where the reading can be made. Therefore, a vector originating from the center of the graduation scale and parallel to the needle angle can be drawn. This vector corresponds to the projection of the needle pointer from the needle rotational plane to the plane of the graduation scale. Once the pointer is on the scale plane, the angular position of the pointer from the first graduation mark can be determined and the reading can be obtained using the same algorithm as described in step 15 of FIG. 2.

I claim:

1. A method for monitoring an analog meter having a set of graduation segments and at least one needle, the method comprising the steps of:

recording a first digitized image of the meter;

extracting a set of edge points, the points representing the graduation segments;

performing a Hough Transform on the set of edge points so as to obtain a center point of the graduation segments;

extracting an intensity profile of the image along a path through the graduation segments so as to obtain a set of detected graduation segments and a position of the needle relative to the graduation segments;

obtaining a parameter representative of needle position accuracy;

recording a second digitized image of the meter;

obtaining the position of the needle without performing a Hough Transform so as to obtain a position of a center point when the parameter meets a predefined condition; and performing the Hough Transform so as to obtain the center point when the parameter does not meet the predefined condition.

2. The method according to claim 1, wherein a number of discreet contiguous angles are obtained for the parameter when an intensity profile is below a threshold intensity.

3. The method according to claim 1, wherein the step of performing a Hough Transform on the set of edge points further comprises the steps of:

for a subset of graduation segments, obtaining a corresponding candidate segment orthogonal to an edge gradient, of an edge point of each of the graduation segments, whereby the candidate segment is located a predefined distance from the edge point of the graduation segments;

obtaining an extreme value of the distribution of the candidate segment of the subset; and obtaining a centroid of the extreme value.

4. The method according to claim 1, further comprising the step of:

extracting at least one set of local minimum intensity values from the intensity profile by applying a deep pocket criterion and selecting a set of local extreme values comprising a number of the extreme values with a predefined range.

5. The method according to claim 4, further comprising the step of:

obtaining at least two sets of local extreme values from the intensity profile at different radii, each radii with respect to the center point, and merging sets of local extreme values having similar angles.

6. The method according to claim 1, wherein the step of obtaining the position of the needle further comprises the steps of:

defining a range of radii each with respect to the center point;

obtaining at least one angle where the intensity of the image within the range of radii meets a predefined condition.

7. The method according to claim 1, further comprising the steps of:

obtaining a set of edge points in a predefined area surrounding the center point;

performing a Hough Transform on the set of edge points in a predefined area;

obtaining a pivot center of the needle; and projecting the detected position of the needle to a plane of a graduation scale.

8. The method according to claim 1, further comprising the step of:

comparing the positioning of the needle to the detected graduation segments so as to obtain a digital value for a display status of the meter;

comparing the digital value to a preset value; and transmitting a message to a control station via a communication network.

9. An apparatus for monitoring an analog meter, comprising:

a sensor for obtaining a first digitized image of the analog meter;

a data processor programmed for:

extracting a set of edge points from the image wherein the edge points represent graduation segments of the meter, performing a Hough Transform on the set of edge points to obtain a center point of the graduation segments, extracting an intensity profile of the image along a path through the graduation segments;

obtaining a position of the needle relative to the set of detected graduation segments;

obtaining a parameter representative of needle position accuracy, initiating a recordation of a second digitized image of the analog meter, obtaining the position of the needle without performing a Hough Transform so as to obtain a position of a center point when the parameter meets a predefined condition, and performing the Hough Transform so as to obtain the center point when the parameter does not meet the predefined condition, and an interface device for communicating with a communication network data generated by the data processor.

* * * * *